United States Patent
Singman et al.

(10) Patent No.: US 12,155,697 B2
(45) Date of Patent: Nov. 26, 2024

(54) AUTOMATED AGENT FOR A WEB COMMUNICATION FEATURE

(71) Applicant: SKYVERA, LLC, Austin, TX (US)

(72) Inventors: Jeffrey Singman, Manalapan, NJ (US); Dany Sylvain, Gatineau (CA)

(73) Assignee: Skyvera, LLC, Austin, TX (US)

( * ) Notice: Subject to any disclaimer, the term of this patent is extended or adjusted under 35 U.S.C. 154(b) by 0 days.

(21) Appl. No.: 17/383,075

(22) Filed: Jul. 22, 2021

(65) Prior Publication Data

US 2022/0159046 A1    May 19, 2022

Related U.S. Application Data

(63) Continuation of application No. 15/679,294, filed on Aug. 17, 2017, now Pat. No. 11,082,456.

(51) Int. Cl.
*G06F 15/16* (2006.01)
*H04L 65/1069* (2022.01)
*H04L 65/65* (2022.01)
*H04L 67/02* (2022.01)
*H04L 67/141* (2022.01)
*H04L 67/306* (2022.01)

(52) U.S. Cl.
CPC .......... *H04L 65/1069* (2013.01); *H04L 65/65* (2022.05); *H04L 67/02* (2013.01); *H04L 67/141* (2013.01); *H04L 67/306* (2013.01)

(58) Field of Classification Search
None
See application file for complete search history.

(56) References Cited

U.S. PATENT DOCUMENTS

| | | |
|---|---|---|
| 10,425,783 B1 * | 9/2019 | Caldwell ................. H04W 4/14 |
| 10,572,879 B1 * | 2/2020 | Hunter ................. G06Q 30/016 |
| 10,719,757 B2 * | 7/2020 | Fourney .............. G06F 16/3322 |
| 11,545,241 B1 * | 1/2023 | Holmes .................. G16H 10/40 |
| 2017/0111503 A1 * | 4/2017 | McGann ............. H04M 3/5235 |
| 2017/0111509 A1 * | 4/2017 | McGann ............. H04M 3/5238 |
| 2017/0324868 A1 * | 11/2017 | Tamblyn ............... H04L 51/046 |
| 2017/0373992 A1 * | 12/2017 | Nair ........................ H04L 67/10 |

* cited by examiner

*Primary Examiner* — Phuoc H Nguyen

(57) ABSTRACT

According to one example, a method includes facilitating communication between a user web application and an entity. The method may be performed by a communication server of a web communication service. The method includes receiving a request from the user web application to communicate with the entity, establishing a communication session between the user web application and an automated agent, obtaining contextual information associated with the communication session, the contextual information including information provided by the user web application, determining that a user of the user web application should be connected with a live agent, and in response to the determining, connecting the user web application with a terminal of an agent associated with the entity. The method further includes providing the live agent associated with the entity with the contextual information.

22 Claims, 14 Drawing Sheets

AUTOMATED AGENT FOR A WEB COMMUNICATION FEATURE

CROSS-REFERENCE TO RELATED APPLICATIONS

The present application is a continuation of U.S. patent application Ser. No. 15/679,294, filed Aug. 17, 2017, the disclosure of which is incorporated herein by reference in its entirety.

BACKGROUND

Various organizations such as commercial businesses or government agencies often have multiple divisions or departments that are separately contactable. For example, a business may have a sales department, a service department, and a scheduling department. When a user calls the organization, he or she may be presented with a call tree that allows the user to select the department that he or she wishes to contact. In some cases, there are additional options after selecting the first option to help the user get in contact with the person or department he or she intends to contact.

As communication technology evolves, users may use other methods for voice communication than traditional phone technology. One such method includes WebRTC (Web Real Time Communication). WebRTC is a project by the World Wide Web Consortium (3C) to define a set of Application Programming Interfaces (APIs) and media transport standards to enable browser-to-browser and browser-to-device applications for voice, video, and text. The introduction of WebRTC as a solution allows for the creation of new usage models for communication services. One new usage model includes the ability of a web user to simply initiate a real-time communication via a web application on the user's device (e.g., a personal computer, mobile device, etc.). In this model, the user can access an identifier (e.g., uniform resource identifier (URI)) pointing to a specific carrier communication ID (e.g., phone number, SIP user ID) through the web application to initiate the WebRTC communication session.

BRIEF DESCRIPTION OF THE DRAWINGS

The present disclosure is best understood from the following detailed description when read with the accompanying figures.

SUMMARY

Figure 1:
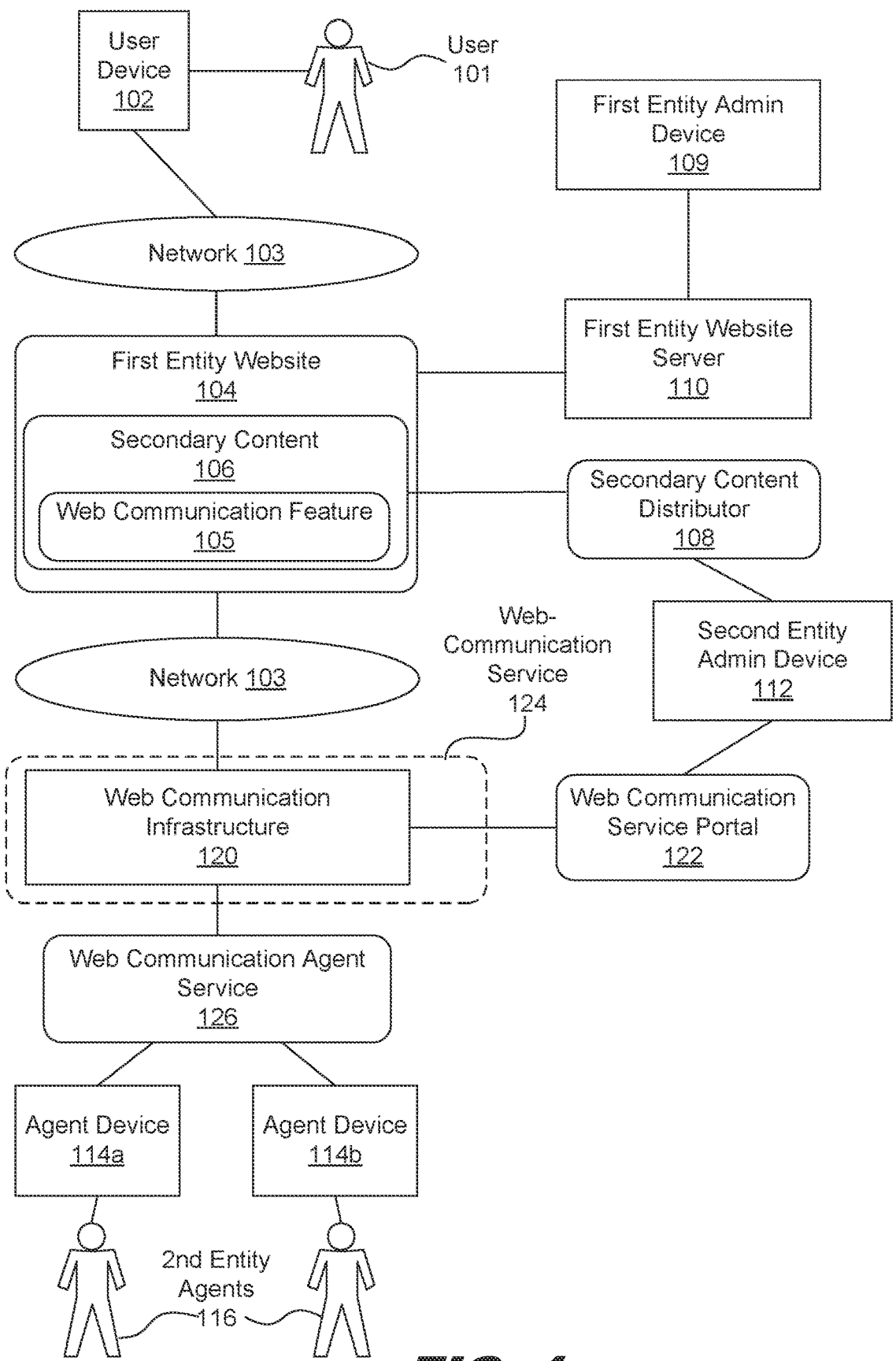
FIG. 1 illustrates an example of the environment in which a user may contact a second entity through secondary content on a first entity's website, according to one example of principles described herein.

According to one example, a method includes facilitating communication between a user web application and an entity. The method may be performed by a communication server of a web communication service. The method includes receiving a request from the user web application to communicate with the entity, establishing a communication session between the user web application and an automated agent, obtaining contextual information associated with the communication session, the contextual information including information provided by the user web application, determining that a user of the user web application should be connected with a live agent, and in response to the determining, connecting the user web application with a terminal of an agent associated with the entity. The method further includes providing the live agent associated with the entity with the contextual information.

According to one example, a computing system includes a processor and a memory comprising machine readable instructions that when executed by the processor, cause the system to: establish a communication session between a user web application and an automated agent server, the user web application interacting with content on a website, the content being associated with an entity, forward a first message from the user web application to the automated agent server, forward a response to the first message from the automated agent server to the user web application, forward a second message from the user web application to the automated agent server, receive an indication that the user web application should be connected to a live agent, and in response to the indication, connect the user web application to a terminal associated with the entity. The system is further to forward contextual information to the terminal. The contextual information includes the first message and the response to the first message.

According to one example, a computer program product comprising non-transitory machine readable instructions that are executable by a computing system, the computer program product comprising: code to receive a request from a user web application to communicate with an entity, code to establish a communication session between the user web application and an automated agent, code to capture contextual information associated with the communication session, the contextual information including information provided by the user web application, code to determine that a user of the user web application should be connected with a live agent, code to connect the user web application with a terminal of an agent associated with the entity, and code to provide the agent associated with the entity with the contextual information.

DETAILED DESCRIPTION

The following disclosure provides many different embodiments, or examples, for implementing different features of the invention. Specific examples of components and arrangements are described below to simplify the present disclosure. These are, of course, merely examples and are not intended to be limiting. In addition, the present disclosure may repeat reference numerals and/or letters in the various examples. This repetition is for the purpose of simplicity and clarity and does not in itself dictate a relationship between the various embodiments and/or configurations discussed.

Various entities such as businesses may wish to connect with their customers using web communication technologies such as WebRTC. Through such communication technologies, agents or representatives of such businesses may communicate to customers using voice, video, or text communication in order to help answer customer questions or to sell products and services to such customers. In some examples, it may be desirable to automate part of the process of communicating to customers.

According to principles described herein, when customers first connect with an entity, they may communicate with an automated agent. The automated agent is configured to analyze messages sent to it by a user (i.e., customer). Then, the automated agent may apply various computing functions to such messages in order to facilitate a response. The automated agent may be, for example, an artificial intelligence designed to mimic human conversation. The automated agent may also be configured to learn from past experiences and update the functions it uses to formulate responses.

At some point during the conversation with the automated agent, it may be determined that the conversation should be transferred to a live agent. For example, the automated agent may receive a message for which it cannot adequately respond. Alternatively, the user may wish to communicate with a live human instead. Thus, the user can be transferred from the automated agent to the live agent. In addition, any useful information regarding the user's conversation with the automated agent can be passed to the live agent. This information may include a recording of the user's conversation with the automated agent. The information may also include any resources that were provided to the user by the automated agent. For example, the automated agent may provide various links to fill out online forms or use other web resources. A list of the resources provided to the user by the automated agent may thus be given to the live agent. Other pieces of information, some of which will be described in further detail below, may be provided to the agent when the conversation is transferred from the automated agent to the live agent.

The web communication features through which users may connect with an entity may be provided in a variety of contexts. For example, such web communication features may be on embedded in the entity's own website. In some examples, the web communication features may be embedded within social media tools. In some examples, the web communication features may be embedded in pieces of secondary content on other websites not managed by the entity.

For example, a website managed by one entity may include content from other entities. Specifically, the primary content of the website may be provided from a server associated with one entity while secondary content may be retrieved from a server associated with a different entity. For example, a search website may have the primary content related to an internet search. Additionally, secondary content from other entities may be presented. Such secondary content may be for the purposes of directing the user of the search website to the websites of the other entities in order to encourage the user to use those websites or purchase products or services from the other entities. In a further example, a social networking website may include primary content related to social networking activities. Secondary content from other entities may also be presented on the social networking website in an attempt to get the user of the social networking website to visit the websites of the other entities.

For purposes of discussion, a first entity refers to the entity associated with primary content. A second entity refers to a provider of secondary content to be presented on a variety of different websites, such as those hosted by the first entity. Thus, the first entity allows secondary content from other entities (e.g., the second entity) to be presented along with their primary content. A user refers to a visitor of the first entity's website, who may also wish to engage with the second entity.

FIG. 1 illustrates an example of the environment in which a user may contact a second entity through secondary content on a first entity's website. According to the present example, the environment includes devices associated with a user 101, devices associated with a first entity, devices associated with a web communication service 124, and devices associated with a second entity. The devices from the different entities, web communication service 124, and user 101 interact with a website 104.

The first entity may be an organization such as a business or government agency. The first entity is associated with a first entity website server 110. That is, the first entity may own, operate, manage, or lease the first entity website server 110. The first entity website server 110 may be one or more physical computing systems that are able to host a website 104 for presentation to users such as user 101. For example, the website 104 may be a search site or social networking site. Other types of sites are contemplated. The website 104 provides primary content to the user. In addition, the first entity may allow secondary content 106 from other entities to be presented on the website 104.

The second entity may also be an organization such as a business or government agency. In addition, the second entity may wish to get the attention of users visiting other websites. For example, the second entity may wish to sell its products or services to visitors of other websites (e.g., website 104).

The second entity is associated with a second entity administrator device. The second entity administrator device may be, for example, a computing device of a person tasked with providing secondary content to other websites. The second entity administrator device may provide secondary content 106 to a secondary content distributor 108. The secondary content distributor may own, operate, manage, or lease various servers that host secondary content for presentation on other websites, such as website 104. The secondary content 106 includes a web communication feature 105 that when activated by a user, connects the user to an agent 116 of the second entity.

The agents 116 of the second entity may be associated with agent devices 114a, 114b. The agent devices may be operated by second entity agents 116. In one example, the second entity agents 116 are associated with call centers and are set up to communicate with and provide service to users who wish to interact with the second entity 118. The agent devices 114a, 114b may be physical computing systems or other types of communication equipment that are capable of using the web communication service 124 to communicate with users, such as user 101.

The web communication service 124 includes a web communication infrastructure 120. The web communication infrastructure 120 includes all the hardware, software, and other types of equipment needed to provide a web communication service. In one example, the web communication service 124 is a webRTC service.

The web communication infrastructure 120 is associated with a web communication service portal 122. The web communication service portal 122 is the means through which a customer, such as the second entity 118, interacts with the web communication service 124 to create the web communication feature 105. For example, the web communication service portal 122 may allow a representative from the second entity to provide the web communication services with various parameters for the web communication feature, such as which of the agents 116 and under what conditions calls should be directed to such agents 116 when a user interacts with the web communication feature 105. The web communication service may then provide the second entity with a piece of code designed for integration with the second entity content 106. Thus, the second entity does not have to create the code but instead relies on the web communication service 124. In this way, the web communication feature is centrally managed.

With such an environment, a user 101 may use his or her device 102 (e.g., a laptop computer, desktop computer, mobile phone, etc.) to access the first entity's website 104. While using the first entity's website, the user may notice the second entity's content 106 and wish to interact with the second entity. The user may then activate the web communication feature. Upon activation, the web communication service 124 sets up a communication session between the user's device 102 and one of the agent devices 114a, 114b of the second entity.

The user device 102 may be, for example, a laptop computer, a desktop computer, or a mobile phone. The user device 102 may be connected to a network 103 such as the Internet in order to access the website 104. The website 104 includes primary content associated with the first entity and secondary content 106 associated with the second entity. In general, the primary content may be stored on the first entity website server 110. The primary content may be placed on the first entity website server from a first entity administrator device 109. The first entity may own, operate, manage, or lease the server 110. In some examples, server 110 represents a plurality of servers working together to provide the primary content. The primary content may be stored on the server 110 and provided to the user device 102 upon request to view the website 104. An application, such as a browser, the user device 102 then renders the primary content for display to the user.

As described above, the website 104 also provides secondary content 106. In some examples, the secondary content is stored on a server associated with a secondary content distributor 108. However, in some examples, the secondary content 106 may be stored on a server associated with the second entity. While viewing the website 104 the secondary content 106 stored on a different server than the first entity website server 110 will also be provided to the user device 102. The application (e.g., browser) will display the secondary content 106 to the user as well as the primary content. In one example, the website 104 may be a news site. Thus, the primary content may be the news provided by the news site and the secondary content may be designed to get the attention of the user in order to draw the user to the second entity.

As described above, the secondary content 106 includes a web communication feature 105. When activated by the user, the web communication feature 105 may call on the web communication service 124 to establish a communication session between the user device 102 and an agent device 114a, 114b associated with the second entity. The communication session may be one of voice, video, or text. In some examples, the user may designate through the web communication feature which communication mode he or she wishes to use. In some examples, the communication mode (i.e., voice, video, or text) may be limited by the capabilities of the user device. For example, if the user device does not have a camera, the user will not be able to engage in video communication.

The web communication service 124 may use web-based communication services as well as traditional telephony services. For example, establishing the communication session may involve dialing a phone number provided by the user for the user device 102. In some examples, establishing the communication session may involve dialing a phone number of the agent device 114a, 114b. If both the agent device and the user device 102 are capable of communicating through IP-based communication technologies, then IP-based communication session (e.g., Voice over IP (VoIP)) may be established. In some examples, both the user device 102 and one of the agent devices 114a, 114b may be capable of using webRTC technology. In such a case, the communication session may be a webRTC communication session.

Figure 2:
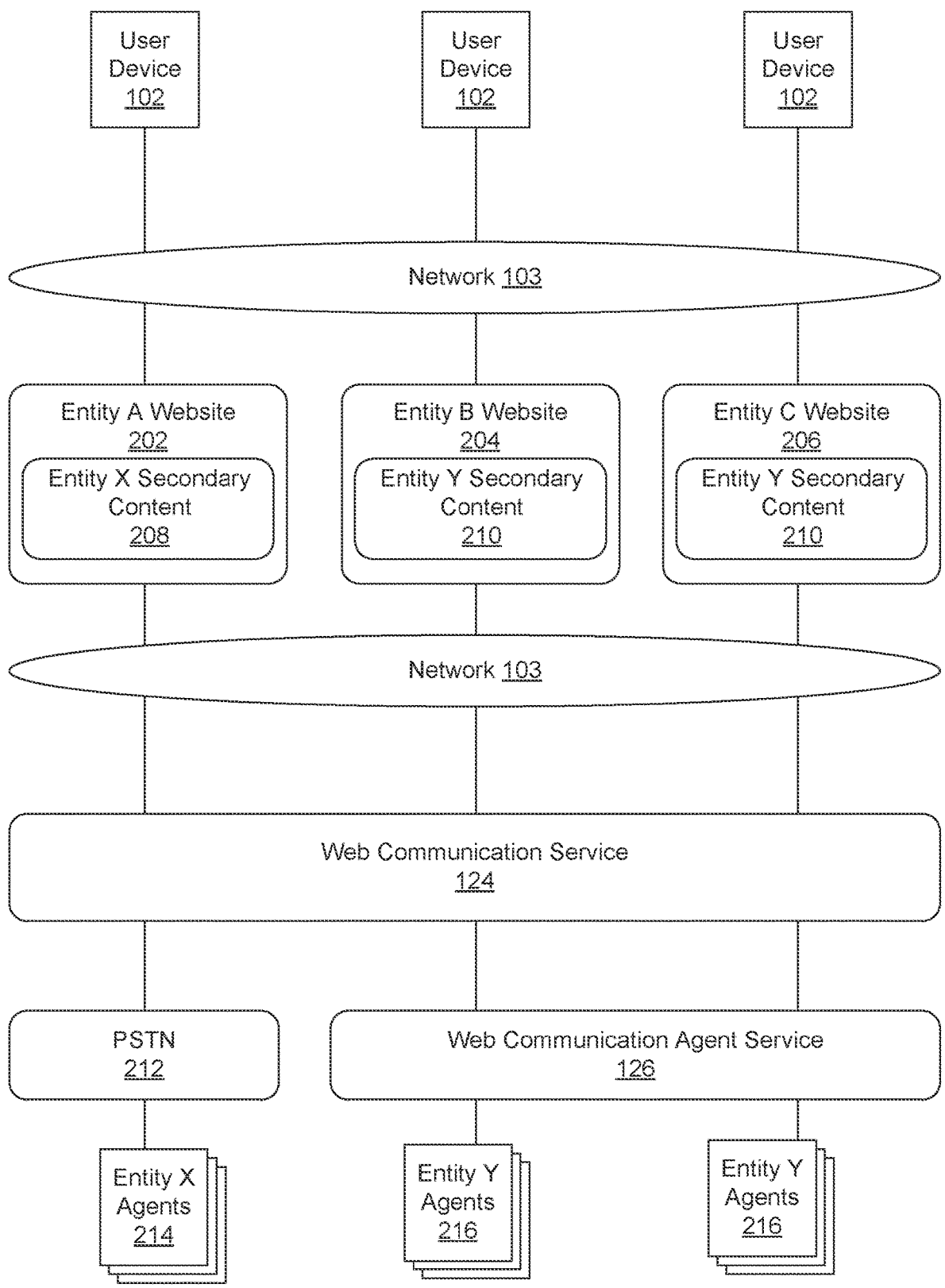
FIG. 2 is a diagram showing the environment in which various pieces of secondary content are provided on multiple websites, according to one example of principles described herein.

FIG. 2 is a diagram showing various pieces of secondary content 208, 210 presented on various websites 202, 204, 206. In the present example, users may use user devices 102 to access the websites 202, 204, 206 over a network 103 such as the Internet. Entity A, Entity B, and Entity C may be similar to the first entity described above. Additionally, Entity X and Entity Y may be similar to the second entity described above. In the present example, Entity A's website 202 includes Entity X's secondary content 208. Both Entity B's website 204 and Entity C's website 206 include Entity Y's secondary content. The secondary content 208, 210 may be handled by a distributor such as the secondary content distributor 108 described above.

Each of the pieces of secondary content 208, 210 may have a web communication feature that facilitates connecting users with agents of the appropriate entity. Each of the web communication features within the pieces of secondary content may be managed by the web communication service 124. Specifically, the web communication service 124 may provide the code for such web communication features and may host at least part of the functionality of such web communication features.

In some examples, the web communication service 124 may connect users to certain agents using a traditional phone service such as a Public Switched Telephone Service (PSTN) 212. In the present example, secondary content 208 for Entity X directs users to Entity X agents 214 using a PSTN 212. The web communication service may also use a web communication agent service 126 to connect with agents. For example, the agents of Entity Y may have computing devices that are enabled for the web communication service, such as WebRTC. The web communication agent service 126 works with the web communication service 124 to provide communication services directly to the agents 216. In the present example, Entity Y's secondary content is presented on at least two different entity's websites 204, 206. Thus, a user visiting either website 204, 206 can contact an Entity Y agent using the web communication feature embedded within the secondary content 210.

Figure 3:
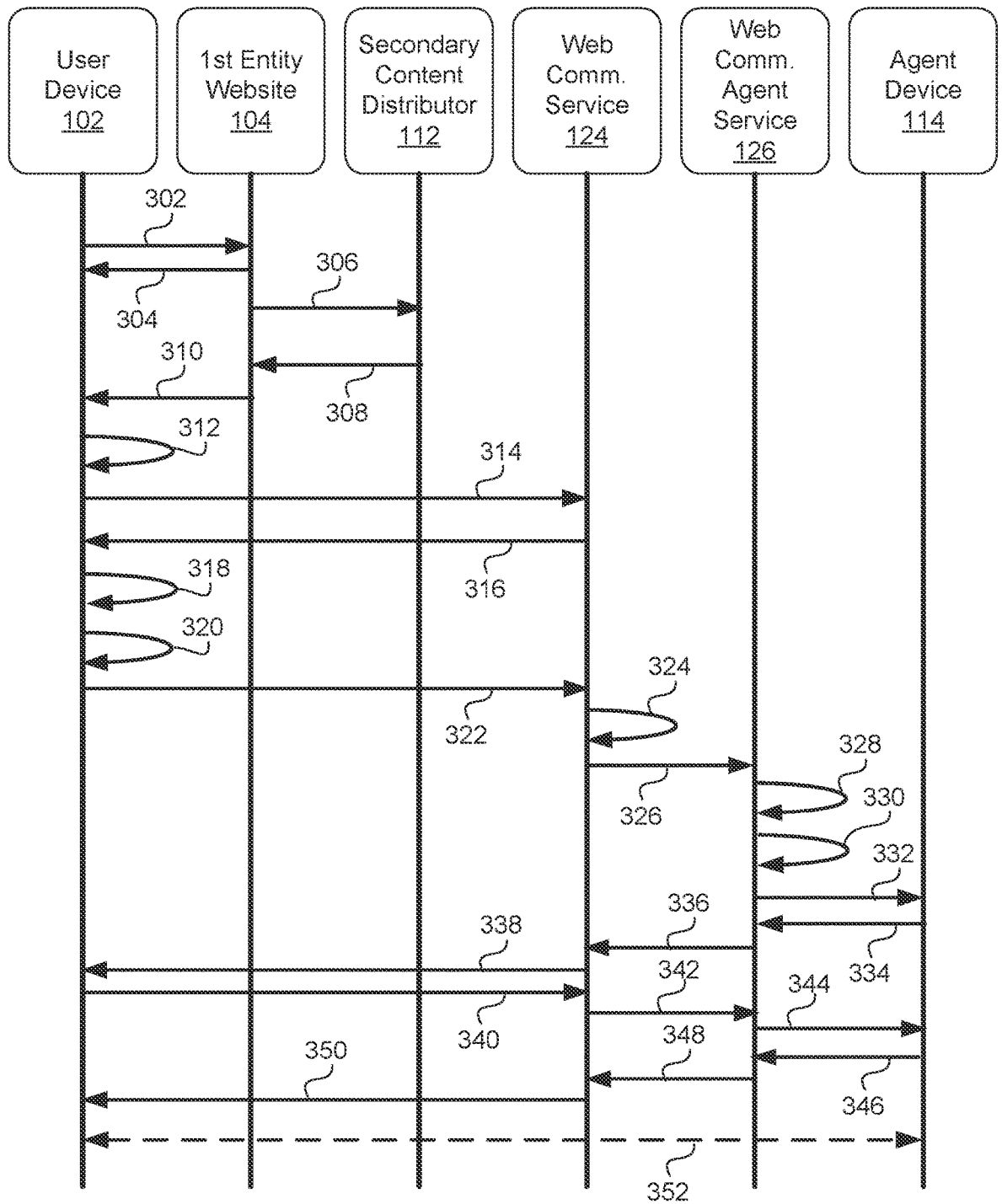
FIG. 3 is a flow diagram showing use of a centrally provided web communication feature, according to one example of principles described herein.

FIG. 3 is a flow diagram showing a user's interaction with a web communication feature embedded within secondary content of a website. According to the present example, at step 302, a user accesses the first entity's website 104 using his or her user device 102. For example, the user may enter a Uniform Resource Locator (URL) into his or her browser to access the first entity website 104. At step 304, the first entity website 104 responds by sending website content back to the user device 102. This content may be formatted, for example, in hypertext markup language (HTML). The content may also include JavaScript and other the web content formats.

Additionally, at step 306, the first entity website 104 requests secondary content from the secondary content distributor 112. At step 308, the secondary content distributor 112 selects one of a variety of pieces of secondary content to provide to the first entity website 104. The selection is based on a variety of factors including the nature of the first entity website 104, or any other information obtained from the user. The secondary content provided to the first entity website 104 also includes code for the web communication feature described above. At step 310, the first entity website 104 provides the secondary content to the user device 102, along with the code to create the web communication feature for the user.

At step 312, the user interacts with the secondary content. In response to the user interacting with the secondary content, the user device 102 uses the code provided with the secondary content to request a user interface associated with the second entity at step 314. In other words, the user device is requesting a user interface designed by the second entity for use by the user. In response, at step 316, the web communication service provides the user device 102 with code to present the user interface.

Step 318, the user device 102 presents the user interface for the web communication feature to the user. Specifically, the user device 102 uses the code for the interface retrieved in steps 314 and 316. At step 320 the user pushes a button indicating that the user wishes to contact the second entity. For example, the user may type a message within a text entry field, the message indicating that the user wishes to speak with a representative of the second entity.

At step 322, the user device 102 sends a message to the web communication service 124. In the present example, the message may be a text formatted message that says "I need help." In response to the user sending the message, the web communication feature 124 determines a destination address for the second entity at step 324. In some examples, the destination address may be a terminating address for the second entity. The terminating address may be a single address behind which multiple addresses associated with various agents exist. For example, the terminating address may be to the web communication agent service 126. In such example, the process continues at step 326, in which the web communication service 124 forwards the message from the user device 102 to the web communication agent service 126.

At step 328, the web communication agent service 126 puts the message in a queue until an agent is available. At step 330, it is determined that an agent becomes available. At step 332, the message is forwarded to the available agent's agent device 114. At step 334, the agent responds to the message. For example, the agent may respond with a message that states: "how can I help?" At step 336, the web communication agent service 126 forwards the response to the web communication service 124. At step 338, the web communication service 124 forwards the response back to the user device 102.

At step 340, the user requests to engage the agent in a voice call. For example, the user may push a button within the user interface of the web communication feature to call the agent. Thus, the user device 102 sends a request to start the voice call to the web communication service 124. In response, the web communication service forwards the request to start the voice communication to the web communication agent service 126 at step 342. The web communication agent service 126 then forwards the request for a voice communication to the agent device 114 at step 344. At step 346, the agent responds with an answer message to the web communication agent service 126. The web communication agent service 126 then forwards the answer to the web communication service 124 at step 348. At step 350 the web communication service 124 forwards the answer back to the user device 102. At step 352, a voice communication is established between the user device 102 and the agent device 114.

In some examples, the user may first communicate with a bot agent. For example, an artificial intelligence programmed to respond to user questions may interact with the user. At some point during the conversation with the bot, the user may be redirected from the bot to a live agent.

Figure 4:
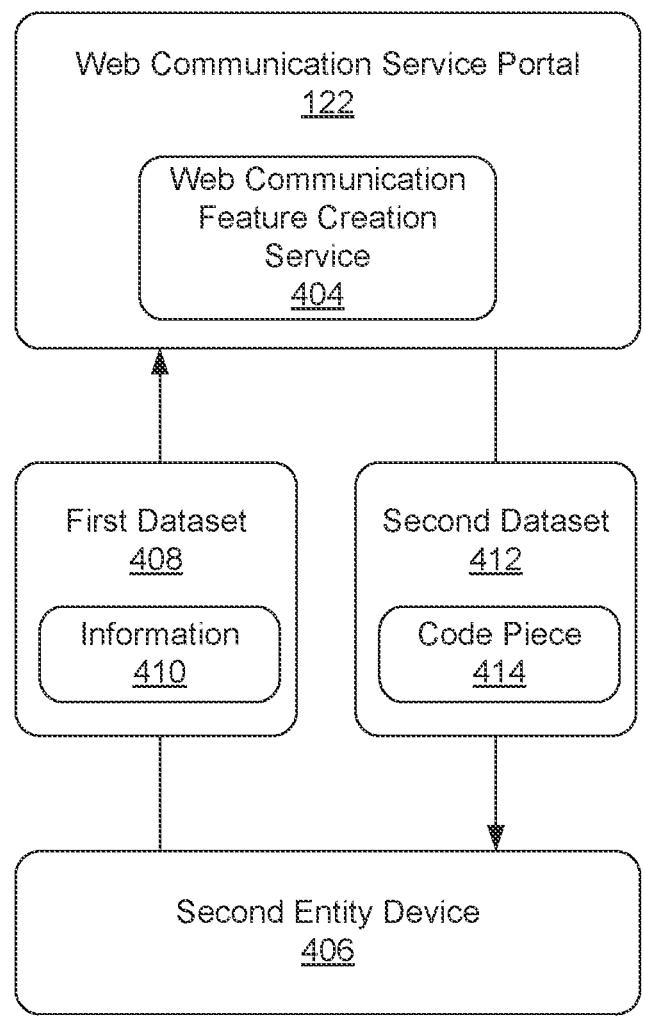
FIG. 4 is a diagram showing communication between a communication service portal and a client device to create a web communication feature for integration with secondary content, according to one example of principles described herein.

FIG. 4 is a diagram showing communication between a communication service portal and a second entity device to create a web communication feature for integration with secondary content. FIG. 4 illustrates data passed between the web communication service portal 122 and a second entity device 406. The second entity device 406 may be a computing system operated by a representative of the second entity.

In one example, a user may access a web communication feature creation service 404 through the web communication service portal 122. The web communication feature creation service 404 may include the hardware, software, or combination of both to provide customers with the ability to create a web communication feature. The web communication feature creation service 404 may provide a user interface to customers through, for example, a website. The user interface may provide the customer with the tools to create a customized web communication feature that connects users with the desired persons associated with the second entity.

According to the present example, a first dataset 408 is sent from the second entity device 406 and received by the web communication service portal 122. The first dataset 408 includes any data that is sent together or separately to the web communication service portal 122 for use by the web communication feature creation service 404. The first dataset 408 includes information 410 that is used to customize the web communication feature.

Such information 410 may include a set of destination addresses for the agents of the second entity to which a user should be connected, or a terminating destination address for the second entity. The destination addresses may be, for example, a phone number for such agents. In examples that involve communication to Internet Protocol (IP) destinations, the destination addresses may be IP addresses. The information 410 may also specify criteria as to which subsets of the set of destination addresses should be used under certain circumstances. Such circumstances may include information obtained from the user or the first entity website on which the second entity content is being displayed. One such circumstance may be the language in which the website of the first entity is rendered. For example, if the website is being rendered in French, then the user should be routed to a destination address of an agent that speaks French. Additionally, based on the location of the user, a certain subset of destination addresses may be used.

In some examples, the user may provide additional information through the web communication feature that may help identify a subset of the destination addresses to which the user should be connected. Thus, the information 410 may specify what is to be requested from the user and which destination addresses should be used based on responses from the user. Other types of information 410 that may be helpful for connecting the user to the desired agent of the second entity may be included as well.

With the information 410 received in the first data set 408, the web communication feature creation service 404 may create a piece of code 414, alternatively referred to as a code piece 414. The code piece 414 may then be sent in a second dataset 412 from the web communication service portal 122 to the second entity device 406. The second entity may then use that code piece 414 for integration with secondary content.

The code piece 414 may include machine readable instructions that when executed, cause the system executing the code to establish communication between a user and a communication destination specified in the code. In some examples, the code may include a Universal Resource Locator (URL) to resources associated with the web communication service (e.g., 124, FIG. 1). In some examples, the code piece 414 may include proprietary data from the web communication service 124. The code piece 414 may include the logic to present the web communication feature to the user and to establish communication sessions to various communication destinations based on user input. The code piece 414 may also be configured for a particular software platform as defined by the second entity.

Figure 5:
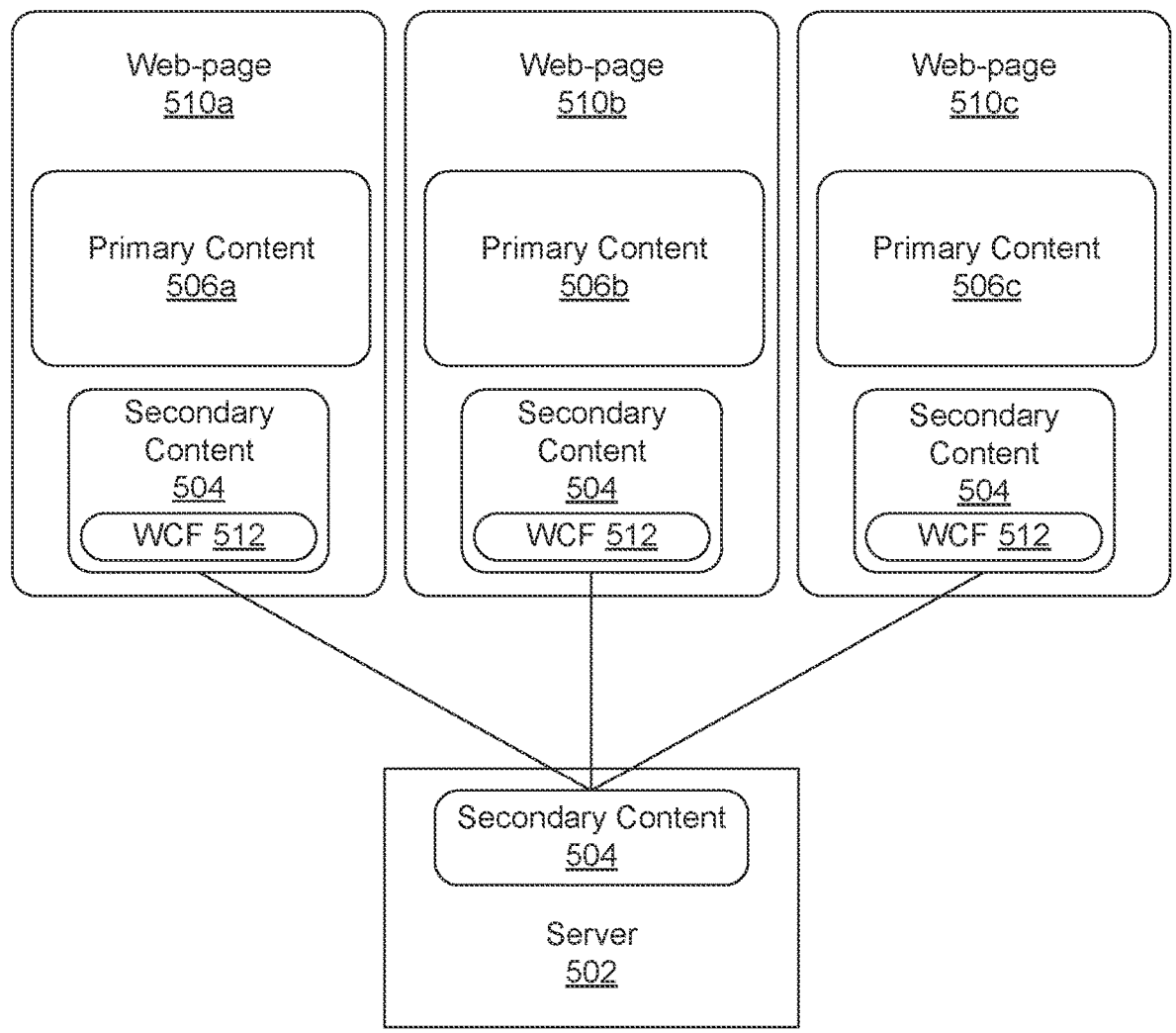
FIG. 5 is a diagram showing use of the web communication feature, according to one example of principles described herein.

FIG. 5 is a diagram showing multiple illustrative websites 510*a*, 510*b*, 510*c* that include the web communication feature 512 within the secondary content 504. Each of the different websites 510*a*, 510*b*, 510*c* may be associated with different entities. For example, website 510*a* may be a food-related website in which the primary content 506*a* is food-related. Website 510*b* may be a social networking site in which the primary content 506*b* is social networking content. Website 510*c* may be a search site in which the primary content 506*c* is search content. Each website 510*a*, 510*b*, 510*c* may include the same secondary content 504 from the second entity. The secondary content may be stored on a server 502 associated with a secondary content distributor. Each instance of that secondary content 504 may also include the web communication feature 512.

Figure 6:
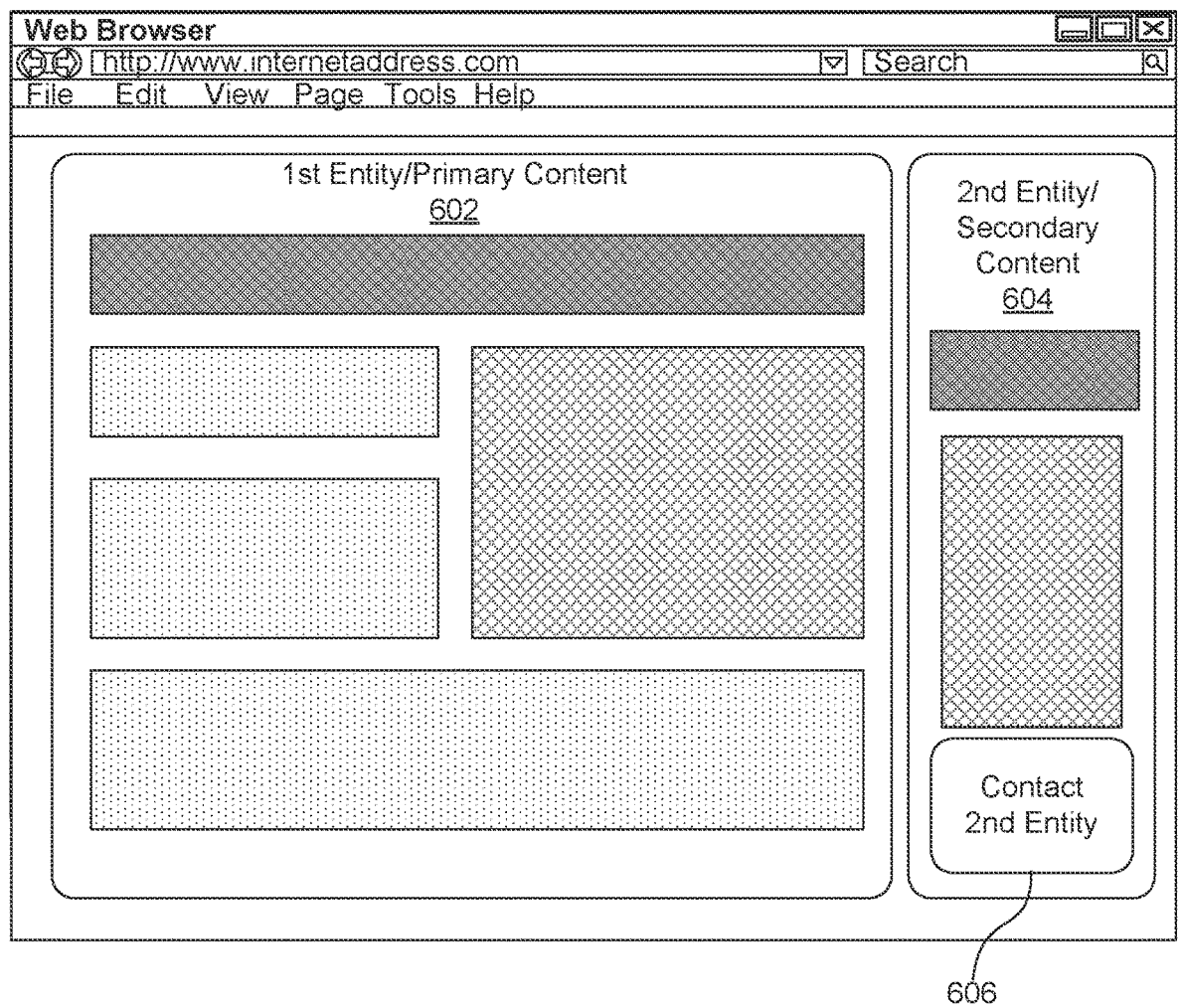
FIG. 6 is a diagram showing an illustrative webpage that includes the web communication feature within secondary content, according to one example of principles described herein.

FIG. 6 is a diagram showing an illustrative webpage of a website, the webpage including the web communication feature within secondary content. According to the present example, a website is rendered for display to a user on a user device. The website displays primary content 602 from the first entity within a majority of the screen space. The secondary content 604 from the second entity is displayed in a smaller portion of the screen space. The secondary content 604 includes the web communication feature that allows the user to contact the second entity. As described above, when the user clicks the web communication feature 606, he or she is connected to an agent of the second entity through the web communication service. The webpage may be rendered using a variety of technologies including, but not limited to, Hypertext Markup Language (HTML), eXtensible Markup Language (XML), and Java.

Figure 7:
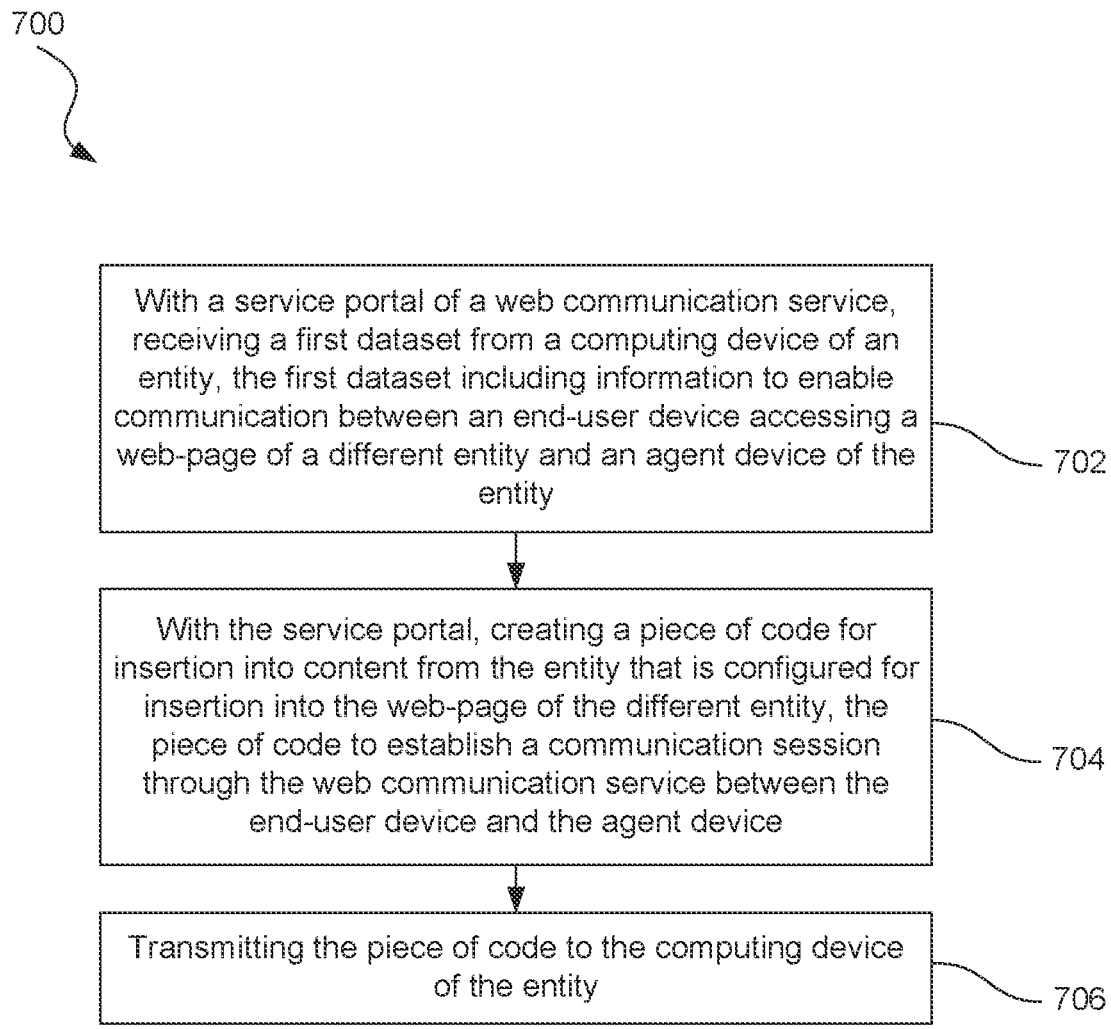
FIG. 7 is a flowchart showing an illustrative method for creating the web communication feature, according to one example of principles described herein.

FIG. 7 is a flowchart showing an illustrative method 700 for creating the web communication feature. According to the present example, the method 700 includes a process 702 for, with a service portal of a web communication service, receiving a first dataset from a computing device of a second entity. The first dataset includes information to enable communication between a user device accessing a website of a first entity and an agent device of the first-entity. As described above, the second entity may be an organization such as a business. That business may wish to present content on the websites of other entities, e.g., the first entity. The first entity may also be an organization such as a business that may agree to include content from other entities on its website.

The method 700 further includes a process 704 for, with the service portal, creating a piece of code for insertion into content from the second entity that is configured for insertion into the website of the first entity. The piece of code is configured to establish a communication session through the web communication service between a user device and the agent device.

The method 700 further includes a process 706 for transmitting the piece of code to the computing device of the second entity. With the piece of code, the second entity can integrate a web communication feature into its secondary content that is made available on the websites of other entities. This web communication feature provides a user with easy access to the appropriate agents of the second entity. The piece of code may be integrated into the secondary content in a variety of manners. For example, the piece of code may be formatted as HTML code and may be inserted into the HTML code for the secondary content. In some examples, the piece of code may be formatted as a Java applet. A link to the Java applet may then be inserted into the code for the secondary content. Thus, when the user clicks the link, the Java applet can be downloaded to the user's computer and executed in the context of the user's browser. Other methods of integration may be used based on the preferences specified by the second entity.

Figure 8:
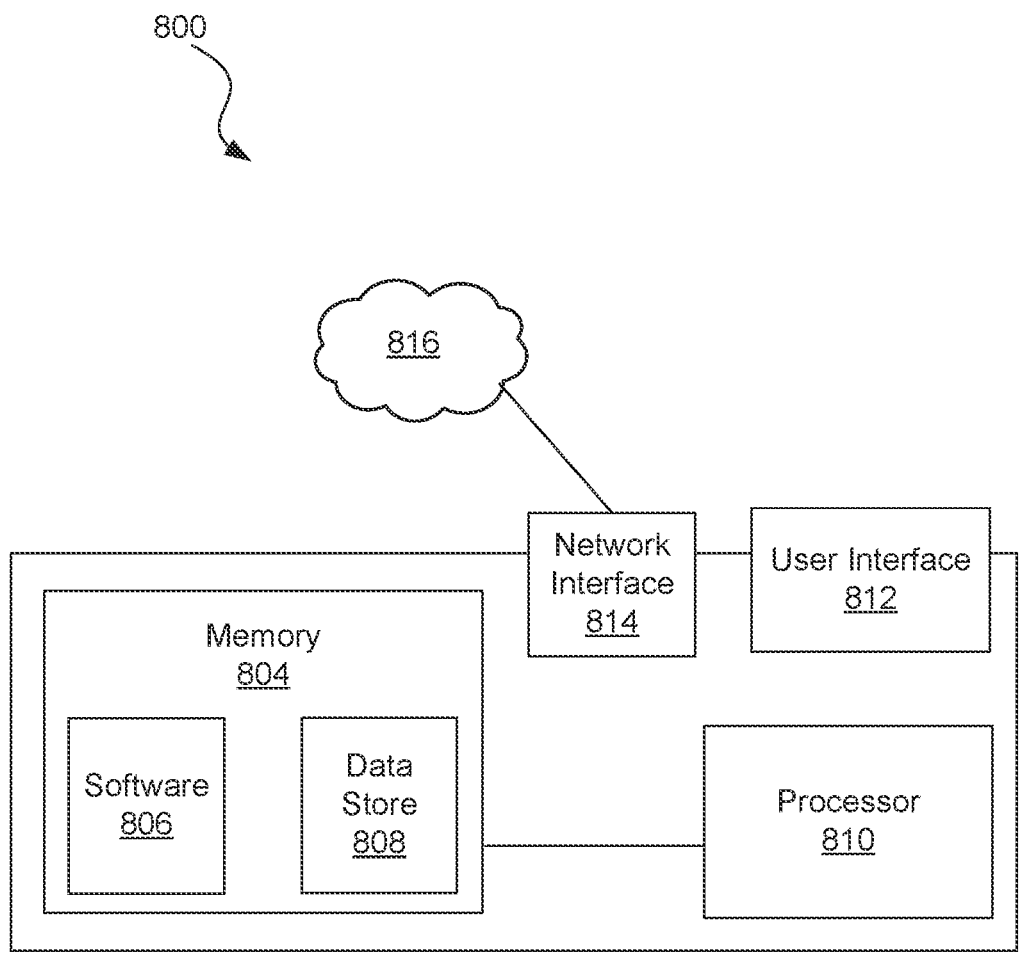
FIG. 8 is a diagram showing an illustrative computing system that may perform functions related to the web communication feature, according to one example of principles described herein.

FIG. 8 is a diagram showing an illustrative computing system that may perform functions related to the web communication feature, such as the functions described above in the text accompanying FIG. 7. The computing system 800 may also be one of: a user device, a second entity device, a second entity server, a first entity server, or a second entity agent device. According to certain illustrative examples, the computing system 800 includes a memory 804 which may include software 806 and a data store 808.

The processing system 800 also includes a processor 810, a network interface 814, and a user interface 812.

The memory 804 may be one of several different types of memory. Some types of memory, such as solid state drives, are designed for storage. These types of memory typically have large storage volume but relatively slow performance. Other types of memory, such as those used for Random Access Memory (RAM), are optimized for speed and are often referred to as "working memory." The various types of memory may store information in the form of software 806 and data in the data store 808.

The computing system 800 also includes a processor 810 for executing the software 806 and using or updating the data 808 stored in memory 804. The software 806 may include an operating system and any other software applications a user may wish to install. The software 806 may be, for example, software designed to provide a web communication feature creation service. In such case, the computing system 800 may be associated with the web communication service. In some examples, the computing system 800 may be associated with a user. In such case, the software 806 may be an application to render web content, such as a browser. The software 806 may include machine readable instructions of a computer program product that when executed, perform the functions described above in accordance with the text accompanying FIG. 5.

The user interface 812 may include a number of input devices such as a mouse, touchpad, or touchscreen that allow the user to interact with the computing system 800. The user interface 812 may also include a number of different types of output devices such as a monitor or a touchscreen. The user interface allows the user to interact with the processing system 800 in a manner as described above.

The network interface 814 may include hardware and software that allows the processing system 800 to communicate with other processing systems over a network 816. The network interface 814 may be designed to communicate with the network 816 through hardwire media such as Ethernet, coaxial, fiber-optic, etc. The network interface 814 may also be designed to communicate with the network 816 using wireless technologies.

Figure 9:
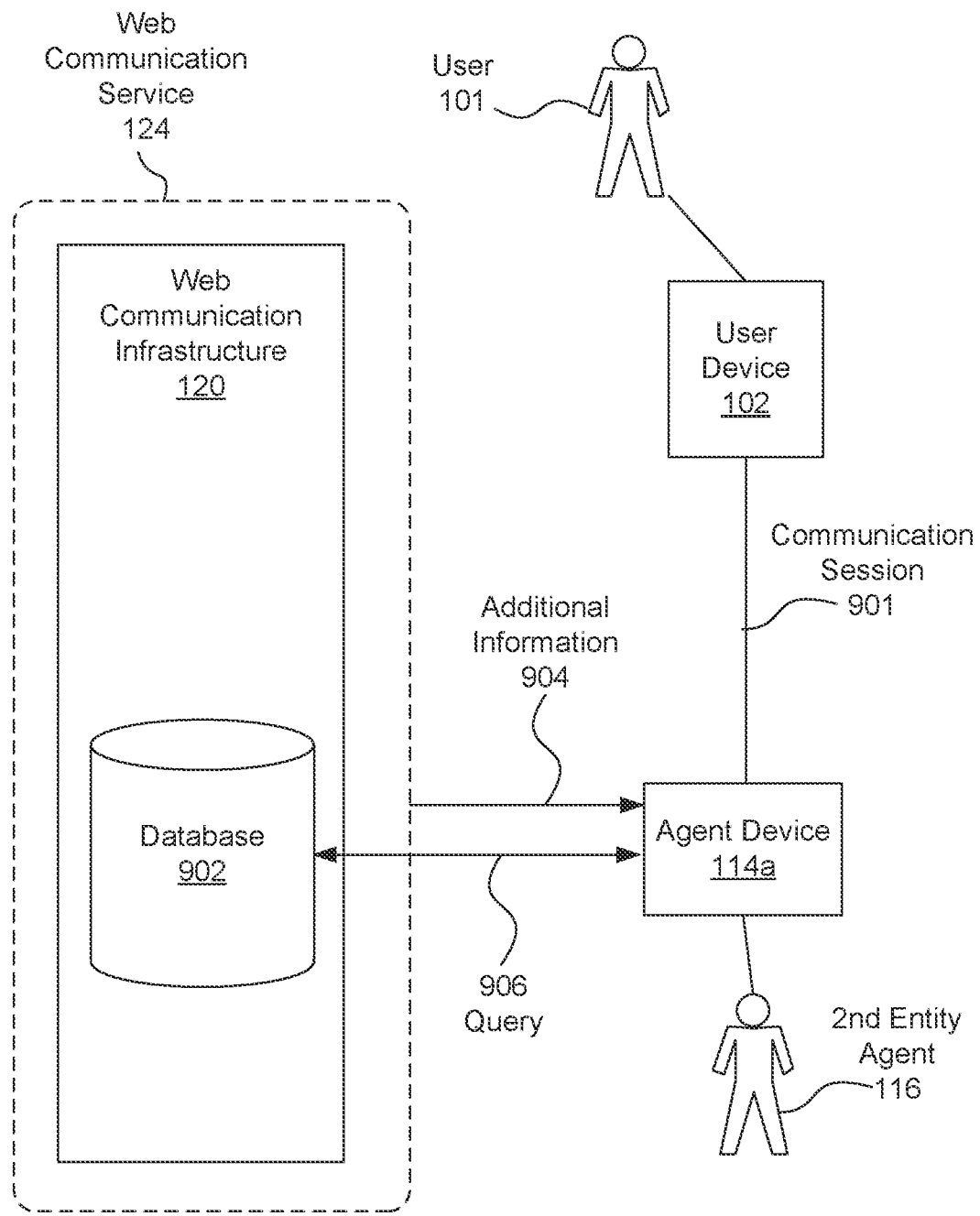
FIG. 9 is a diagram showing additional information provided to an agent of the second entity, according to one example of principles described herein.

FIG. 9 is a diagram showing additional information provided to an agent of the second entity. In some examples, when a user 101 is connected to an agent 116 through the web communication session, the agent 116 may be provided with additional information associated with the communication session. For example, the agent device 114 may be provided with a unique identifier that uniquely identifies the content in which the web communication feature used to indicate the communication session 901 was used. Thus, the agent 116 is made aware of the piece of secondary content the user 101 was looking at when he or she initiated the communication session 901. This may be particularly useful to the agent if the second entity has several different types of content (e.g., for different products or services) for display on various websites.

In some examples, the additional information 904 may include other information that may be helpful for the agent. For example, if the piece of secondary content into which the web communication feature is inserted is set up to allow user input, then any such input may be provided to the agent. The additional information 904 may indicate the website of first entity in which the secondary content through which the user contacted the second entity was placed. The additional information may include the language in which that website is rendered. The additional information may be location information associated with the user.

In some examples, the agent 116 may be provided with the ability to query 906 a database 902 of the web communication infrastructure 120 for records associated with the particular piece of secondary content through which the user 101 contacted the second entity. This may allow the agent to obtain data associated with the secondary content, such as how often it is presented to users, how often users choose to contact the second entity, etc. The database 902 may include other records that may be of interest to the agent.

In some examples, the additional information 904 that is sent to the agent is specified in the first dataset (e.g., 408, FIG. 4) that is sent to the web communication service portal 122 when the second entity is having the web communication feature created. For example, the second entity may provide the web communication service with a unique identifier for the secondary content into which the web communication feature will be inserted. The second entity may also specify what other types of information should be obtained and provided to the agent 116 when a user 101 chooses to contact the second entity.

Figure 10:
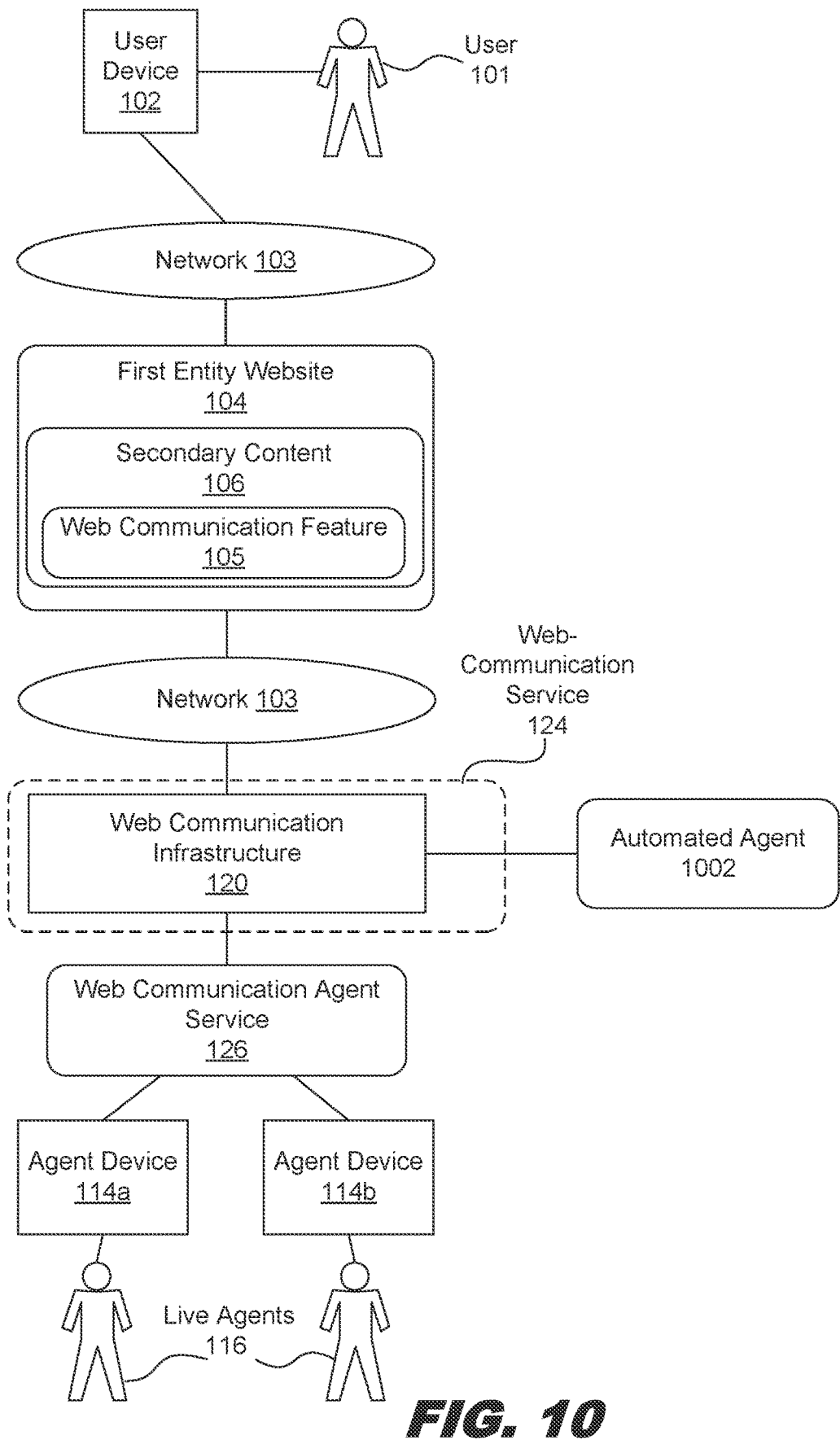
FIG. 10 is a diagram showing an example of the environment in which an automated agent for a web communication feature may be used, according to one example of principles described herein.

FIG. 10 is a diagram showing an example of the environment in which an automated agent 1002 for a web communication feature may be used. According to the present example, the web communication service 124 may be in communication with an automated agent 1002 over any appropriate data connection, such as a TCP/IP connection using HTTP or the like. The automated agent 1002 may include one or more physical computing systems, such as servers, that work together to provide the functionality of the automated agent 1002. The automated agent 1002 is designed to output a response to a message in view of a number of inputs. Such inputs may include a message from a user. Such inputs may also include other information associated with the user.

The mechanisms by which the automated agent 1002 responds to messages from a user may be based on machine learning. Machine learning involves providing a number of sample inputs coupled with desired outputs. Machine learning mechanisms may then derive a model for the relationships between inputs and desired outputs. This model may be used to create functions that when applied to future inputs, will result in desired outputs. In general, the more sample inputs along with desired outputs that are provided, the more versatile the machine learning model may become. Additionally, the model may be continually updated as it is used. In the present example, sample inputs may include past messages sent by actual users along with responses provided by live agents to those messages. The functions created by the machine learning model may then be applied to actual messages received from users. The responses created by application of the functions may then be provided to such users.

The automated agent 1002 may be designed to provide service to multiple entities. In some cases, the functions applied to messages for one entity to produce a response for that entity's customers may be different than functions applied to messages for another entity's customers. Specifically, the different functions may use a different model that is based on past communication specific to that entity.

The automated agent 1002 may be able to respond in a variety of modalities. For example, the automated agent 1002 may respond to text based messages with text based responses. Similarly, the automated agent 1002 may respond to voice-based messages with voice-based responses. Video messages and responses may be utilized as well.

The automated agent 1002 may be used to respond to messages by a variety of users wishing to interact with a particular entity. Such messages may be, for example, a question related to a product or service. In many cases, the automated agent 1002 may be able to satisfactorily handle the users' messages. However, in some instances, it may be desirable that the user is transferred from the automated agent 1002 to a live agent 116.

Figure 11A:
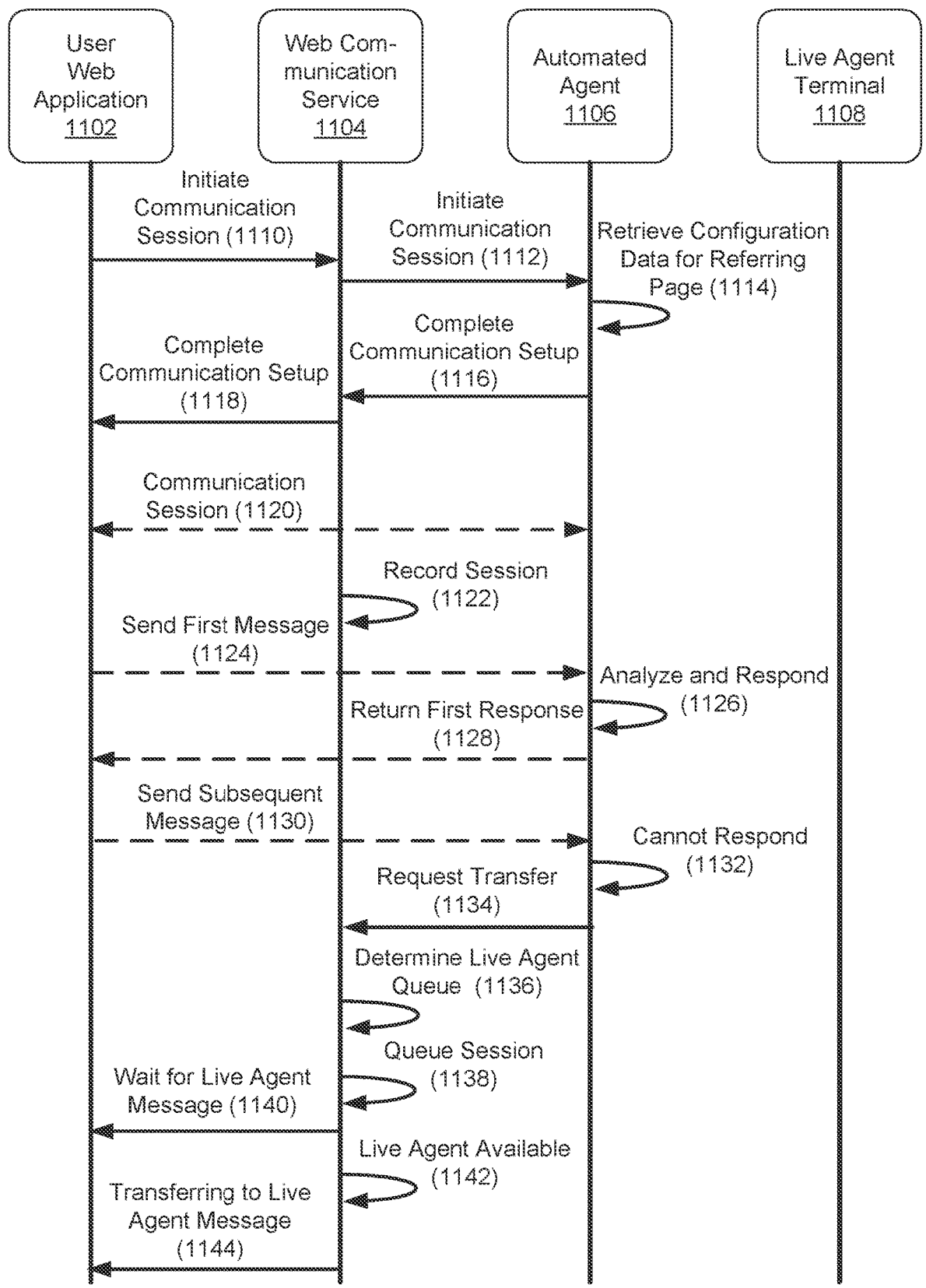
FIGS. 11A and 11B are flowcharts showing use of an automated agent for a web communication feature, according to one example of principles described herein.
Figure 11B:
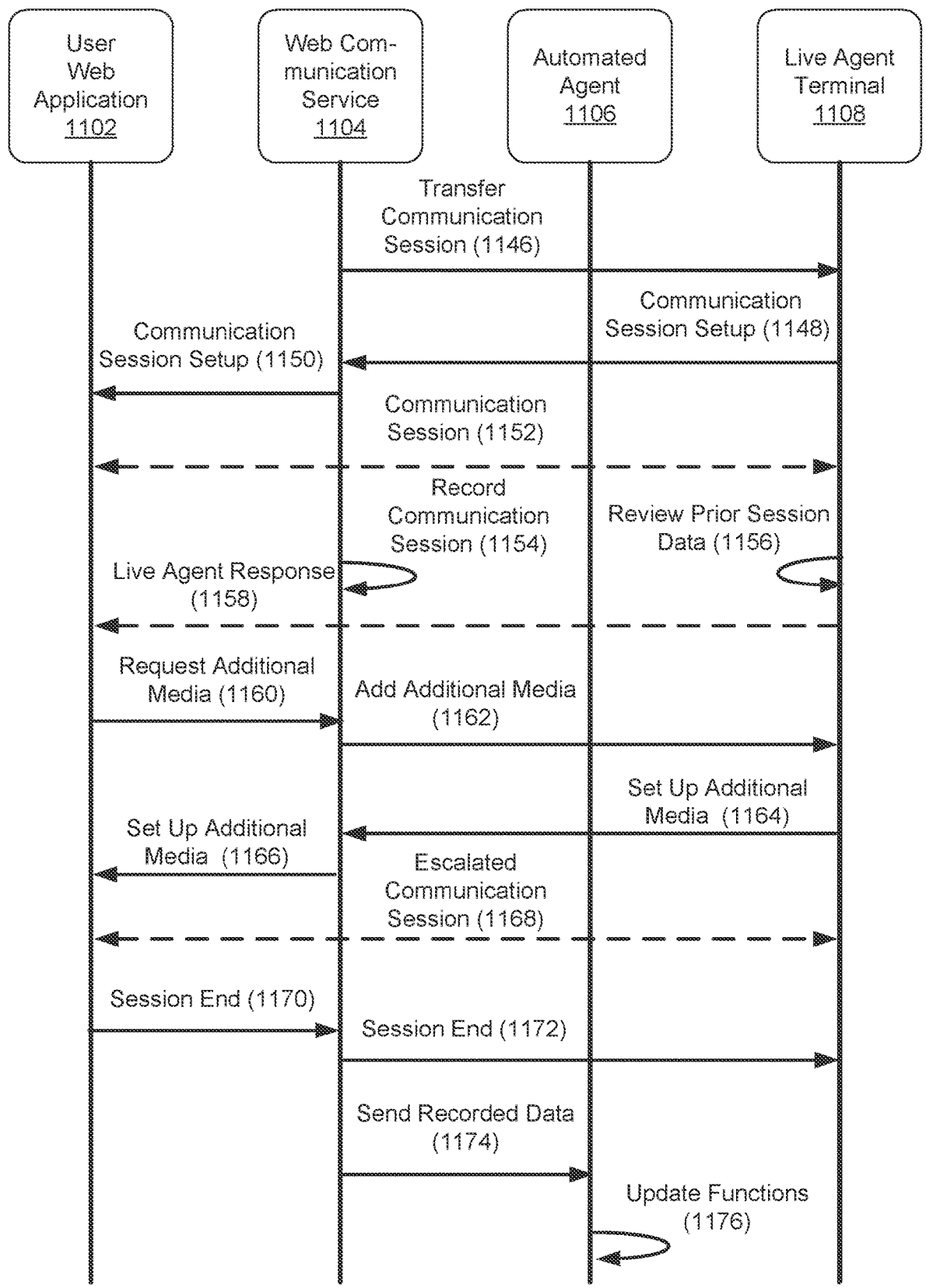

FIGS. 11A and 11B are flowcharts showing use of an automated agent for a web communication feature and transition to a live agent. According to the present example, the method for using an automated agent for a web communication feature involves a user web application 1102, a web communication service 1104, an automated agent 1106, and a live agent terminal 1108. The different components described herein may communicate using various protocols such as HTTP, SIP, RTP and various other protocols associated with WebRTC.

The user web application 1102 may be, for example, a web browser with a WebRTC client or other real-time communication functionality. For example, a user may visit a website associated with a particular entity, or a website that hosts a web communication feature associated with the entity. The user web application 1102 may also be any other type of application designed to render web content such as HTML, javascript, flash, and other web technologies. The web communication service 1104 may be similar to the web communication service 124 described above. The web communication service 1104 may also include functions provided by the web communication agent service (e.g., 126, FIG. 1). Additionally, the automated agent 1106 may be similar to the automated agent 1002 described above.

The live agent terminal 1108 may represent a computing device associated with a live agent acting on behalf of the entity. For example, the live agent terminal 1108 may represent a desktop computer operated by an agent. In some examples, the live agent terminal 1108 may represent a computing system that directs and routes incoming calls to one of several agents associated with the entity.

According to the present example, at step 1110, a user interacts with the user web application 1102 to cause the user web application 1102 to initiate a communication session. For example, the user may have a question about a product or service described by the website that he or she is visiting. The user may use a web communication feature, such as by selecting a "chat" option on a WebRTC client. Specifically, the user may click a link or a button within the web communication feature that indicates that he or she wishes to communicate with the entity. In some examples, the user may also specify the mode of communication (i.e., text, voice, video). For the sake of the present example, it will be assumed that the user wishes to engage in a text based conversation. Thus, the signal sent to the web communication service 1104 to set up a communication may indicate a text-based communication.

In response, the web communication service 1104, at step 1112, then notifies the automated agent 1106 that a user wishes to communicate with a particular entity. The signal at step 1112 may also indicate that the user wishes to communicate in a text-based conversation. The signal at step 1112 may also indicate the website through which the user initiated the communication session. That way, the automated agent knows with which entity the user wishes to communicate.

At step 1114, the automated agent 1106 retrieves configuration data for the entity the user desires to contact. Different entities may have different protocols for responding to messages from users. Thus, by retrieving the configuration data for the appropriate entity, the automated agent can respond in a manner consistent with the entity's expectations.

At step 1116, the automated agent responds by indicating it is ready to communicate with the user and passes any information needed to establish the communication session between the user web application 1102 and the automated agent 1106. At step 1118, the web communication service passes the information from the automated agent 1106 to the user web application 1102. Thus, at step 1120, a communication session is established between the user web application 1102 and the automated agent 1106. Establishing such a communication session may be done, for example, by using signaling over HTTP. After the communication session has been established, Real-time Transfer Protocol (RTP) may be used to pass media data.

At step 1122, the web communication service 1104 may record the communication session between the user web application 1102 and the automated agent 1106. For example, if the communication is text-based, then the web communication service can create a text record of that conversation. If the communication is a voice communication, then the web communication service 1104 may record the conversation and/or transcribe the conversation and create a text-based transcript of the conversation.

At step 1124, the user sends a first message to the automated agent. For example, the user may ask a question about a particular product for sale on the entity's website. At step 1126 the automated agent uses the first message as an input as well as any other important information, if appropriate, and applies the appropriate function to that message to determine a response. More specifically, the automated agent may apply a machine learning model function to the input to determine an appropriate output. The function may use various techniques such as neural networks or deep learning to determine if the input is similar to sample inputs and to determine a desired output. The function may be based on sample inputs and desired responses that are specific to the entity with which the user is communicating. For example, the user may ask a question such as "does this product come in the color blue?" In response, the automated agent may query a database that indicates which product variations are in stock. The automated agent may then determine that a blue version of the product is available and respond to the query with a "Yes" and may include a picture of the blue version of the product or any other useful information. At step 1128 the automated agent sends that response back to the user web application.

At step 1130, the user sends a subsequent message to the automated agent 1106 through the user web application 1102. The automated agent 1106 then applies the appropriate function but determines that it is unable to respond at step 1132. This may be, for example, because the model created has not seen an input similar enough and thus it cannot create a response with sufficient confidence. Thus, the automated agent 1106 sends a notification to the web communication service to transfer the communication session to a live agent at step 1134. While in the present example, the trigger for transferring the communication session to a live agent is a determination made by the automated agent, other triggers may be used. For example, the user may request the transfer at any time. Alternatively, the web communication service 1104 may include logic for determining if the communication session should be transferred. Thus, the web communication service may trigger the switch.

At step 1136, the web communication service determines the live agent queue to which the communication session is to be assigned. Such assignment may be based on a variety of factors including information provided by the automated agent, with the information including the topic of the conversation, importance or urgency of the request, user status, value of past or current user transaction, or any other derived or retrieved information by the automated agent that can assist determination of the live agent queue to select and the priority it should have. For example, the automated agent may have determined that the user: 1—is a man, 2—wants to buy a shirt, 3—is unsure of size or color, 4—speaks Spanish, 5—has $300 of items in his shopping cart, 6—has been shopping on line for 30 minutes, 7—is getting impatient, 8—call should be put on the priority queue for clothing purchase. At step 1138, the web communication service 1104 queues the communication session in the assigned queue. Additionally, at step 1140, the web communication service 1104 may send a message to the user instructing the user to wait for a live agent to become available.

At step 1142, the web communication service 1104 determines that a live agent is available. At step 1144, the web communication service 1104 may notify the user that he or she is currently being transferred to a live agent. At step 1146, the web communication service sends a transfer message to the live agent terminal 1108. The transfer message includes any information the live agent terminal may employ to establish the communication session with the user web application.

The transfer message also includes contextual information that may be helpful to the live agent. Such contextual information may include, for example, the conversation that was recorded by the web communication service. The contextual information may also include any interactions the user has had with the entity's website. For example, the contextual information may include any session data collected from the user. The contextual information may also include any web resources provided to the user by the automated agent. For example, the user may have forgotten his or her password. The automated agent 1106 may have determined that the user is having trouble logging in and provided the user with a link to reset his or her password. The contextual information may include information derived by the automated agent based on its interaction with the user, including topic of the conversation, user preferences, user status, current or past transactions, priority, language, sex, age or any other useful information that may assist the live agent. For example, the automated agent may have determined that the user: 1—is a man, 2—wants to buy a shirt, 3—is unsure of size or color, 4—speaks Spanish, 5—has $300 of items in his shopping cart, 6—has been shopping on line for 30 minutes, 7—is getting impatient, 8—was put on the priority queue for clothing purchase. In a further example, the contextual information obtained by the automated agent may include a conversation state, a conversation topic, the user's identity, the user's preferences, the user's goals, the user's location, the user's language, the user's emotional state, and/or the user's budget.

At step 1148, the live agent terminal responds with communication setup information, which is then forwarded by the web communication service 1104 to the user web application 1102 at step 1150. With this setup information, the communication session between the user web application 1102 and the live agent terminal 1108 is established at step 1152.

At step 1154, the web communication service 1104 may record the conversation occurring over the communication session. For example, if the communication is text-based, then the web communication service 1104 can create a text record of that conversation. If the communication is a voice communication, then the web communication service 1104 may record the conversation and/or transcribe the conversation and create a text-based transcript of the conversation.

Additionally, at step 1156, the live agent may review the prior session information that was recorded by the web communication service 1104. This information may allow the live agent to get caught up with the conversation so that he or she can better help the user. The live agent may also review any contextual information that was provided to the live agent.

At step 1158, the live agent sends a response to the user. For example, the live agent may ask: "How can I help you." This response may be done in a text-based conversation. The user may then converse with the live agent using the text based communication session. However, at some point, the user may desire to escalate the conversation to include additional media, such as voice communication.

At step 1160, the user web application sends a request for additional media to the web communication service 1104. At step 1162, the web communication service 1104 forwards the request for additional media to the live agent terminal 1108. At step 1164, the live agent terminal responds to the web communication service with any information needed to establish voice communication between the live agent terminal 1108 and the user web application 1102. At step 1166, the web communication service 1104 forwards that information to the user web application 1102. Thus, the escalated communication session, which includes text and an additional media such as voice, is established at step 1168.

When the user is finished communicating with the agent, the user may terminate the conversation. This causes the user web application to send a terminate signal to the web communication service 1104 at step 1170. Then, the web communication service 1104 forwards the terminate signal to the live agent terminal 1108 at step 1172.

The entity may wish to improve the automated agent's ability to respond to various messages from other users. Accordingly, the web communication service may send the recording of the conversation between the user and the live agent to the automated agent 1106 at step 1174. The automated agent 1106 may take that information and use it to improve the functions it applies when responding to messages on behalf of the entity at step 1176. For example, the automated agent may use the messages from the user as sample inputs and the responses from the live agent as desired outputs to improve the machine learning model.

Figure 12:
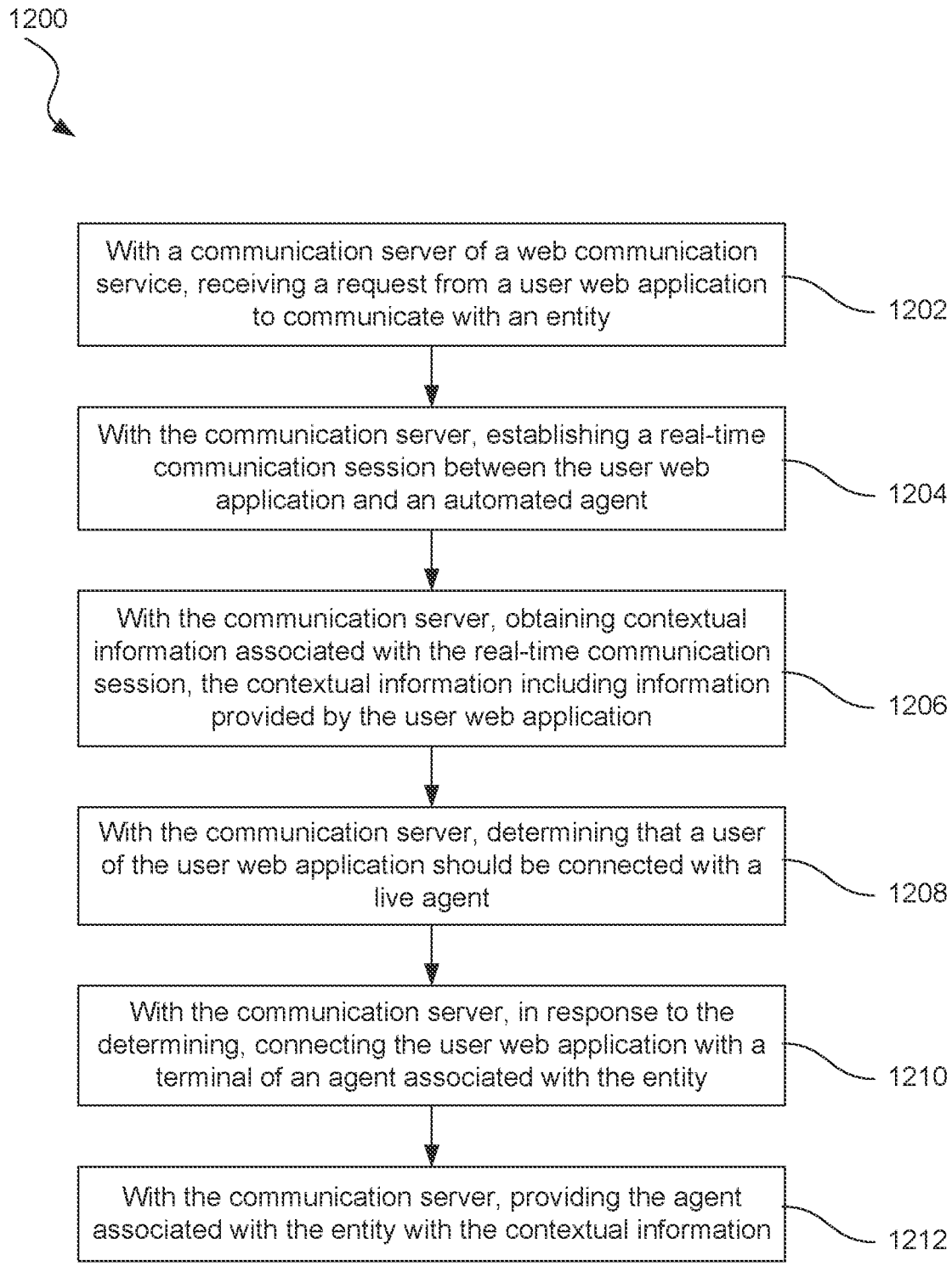
FIG. 12 is a flowchart showing an illustrative method for a web communication service to transfer a communication session from an automated agent to a live agent, according to one example of principles described herein.

FIG. 12 is a flowchart showing an illustrative method for a web communication service to transfer a communication session from an automated agent to a live agent. According to the present example, the method includes a step 1202 for receiving a request from a user web application to communicate with an entity. In one example, the request is a WebRTC request. This request may also specify a particular mode of communication (i.e., voice, video, text). The request may also include other information about the user, such as the web page from which the user is sending the request.

The method 1200 further includes a step 1204 for establishing a communication session between the user web application and an automated agent. The communication session may be, for example, a WebRTC communication session. The established communication may be of a mode selected by the user. The automated agent may also receive information about the user such as the web page from which the user is communicating. Any other information that can be obtained by the automated agent may also be used by the automated agent to provide helpful responses to the user. For example, if the particular user has previously interacted with the automated agent, then data from those previous conversations may be helpful to the automated agent.

The method 1200 further includes a step 1206 for obtaining contextual information associated with the communication session. The contextual information may include information provided by the user web application. Such information may include identification of the website from which the user is contacting the entity. Any information collected by cookies may also be provided by the user web application. In some examples, the web communication feature on the website may request some basic information from the user. This basic information may also be provided as contextual information to the web communication service.

The method 1200 further includes a step 1208 for determining that a user of the user web application should be connected with a live agent. As described above, this determination may be made based on a variety of occurrences. For example, the automated agent may not be able to respond to a request and will therefore indicate that conversation should be transferred. Alternatively, the user may request that the conversation be transferred. In one example, the web communication service itself may trigger the switch.

The method 1200 further includes a step 1210 for, in response to the determining, connecting the user web application with a terminal of an agent associated with the entity. In other words, the user is connected to a live agent of the entity it wishes to contact. The method 1200 further includes a step 1212 for providing the agent associated with the entity with the contextual information. Using this contextual information, the live agent may be better able to help the user.

Figure 13:
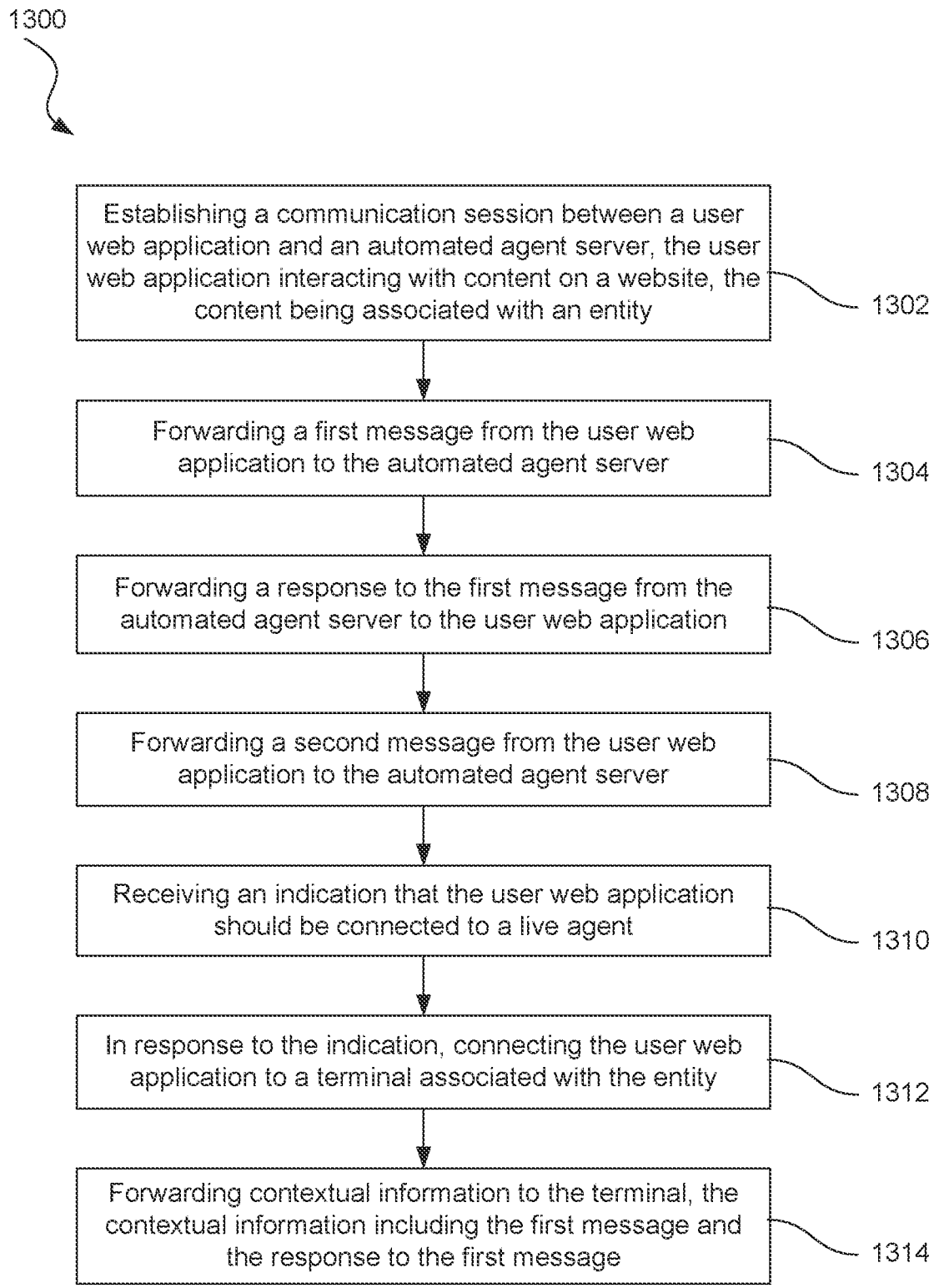
FIG. 13 is a flowchart showing an illustrative method for an automated agent to request transfer to a live agent, according to one example of principles described herein.

FIG. 13 is a flowchart showing an illustrative method for an automated agent to request transfer to a live agent. According to the present example, the method 1300 may be performed by a computing system associated with a web communication service.

According to the present example, the method 1300 includes a step 1302 for establishing a communication session between a user web application and an automated agent server. The user web application may be interacting with content on a website. The content may be associated with an entity. For example, the website may be owned and operated by the entity and thus the content on that website is associated with the entity. Alternatively, the content may be secondary content on another entity's website.

The method further includes a step 1304 for forwarding a first message from the user web application to the automated agent server. The method 1300 further includes a step 1306 for forwarding a response to the first message from the automated agent server to the user web application. Thus, the automated agent is able to respond to the user's first message.

The method 1300 further includes a step 1308 for forwarding a second message from the user web application to the automated agent server. The method further includes a step 1310 for receiving an indication that the user web application should be connected to a live agent. The method 1300 further includes a step 1312 for, in response to the indication, connect the user web application to a terminal associated with the entity. The method further includes a step 1314, for forwarding contextual information to the terminal, the contextual information including the first message and the response to the first message.

Some examples of processing systems described herein may include non-transitory, tangible, machine readable media that include executable code that when run by one or more processors may cause the one or more processors to perform the processes of methods as described above. Some common forms of machine readable media that may include the processes of methods are, for example, floppy disk, flexible disk, hard disk, magnetic tape, any other magnetic medium, CD-ROM, any other optical medium, RAM, PROM, EPROM, FLASH-EPROM, any other memory chip or cartridge, and/or any other medium from which a processor or computer is adapted to read.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. A method comprising:
hosting a first entity website with one or more website servers of a first entity;
establishing, via a web communication feature of the first entity website and a web communication portal, communication between a web communication service and a networked computer system of a second entity, wherein the web communication service portal enables a user of the second entity to interact with the web communication service;
managing, with the web communication service, web communication of the second entity website and a web communication agent service;
establishing a conversation, via the web communication service and the web communication agent service, between a user web application and an automated agent of the second entity;
obtaining contextual information associated with the conversation, the contextual information including information provided by the user web application;
determining that a user of the user web application should be connected with a live agent of the second entity;
transferring the conversation from the automated agent to the live agent, including connecting the user web application with a terminal of the live agent, receiving setup information from the terminal of the live agent and forwarding the setup information to the user web application, wherein the setup information is forwarded to establish a communication session between the terminal of the live agent and the user web application; and
providing the live agent with the contextual information.

2. The method of claim 1, further comprising:
sending information recorded from the communication session to the automated agent; and
updating an automated agent function based on the information recorded from the communication session.

3. The method of claim 1, wherein the communication session comprises voice.

4. The method of claim 1, wherein the communication session comprises text.

5. The method of claim 1, wherein the contextual information further includes web resources provided to the user web application.

6. The method of claim 1, wherein the contextual information further includes a records of at least a portion of the conversation.

7. The method of claim 1, wherein the contextual information includes information derived by the automated agent by processing information from the conversation associated with the communication session.

8. The method of claim 1, further comprising: selecting the live agent from a plurality of agents based on the contextual information.

9. The method of claim 1, further comprising:
with an automated agent server associated with the automated agent, receiving a request to engage in the conversation; and
with the automated agent server, receiving a first message from the user.

10. The method of claim 9, further comprising:
with the automated agent server, applying a function to the first message to generate a response to the first message; and
with the automated agent server, sending the response to the first message to the user web application.

11. The method of claim 10, further comprising:
with the automated agent server, receiving a second message from the user; and
determining, after applying the function to the second message, that a response to the second message cannot be generated and a transfer to the live agent is required.

12. The method of claim 11, further comprising, with the automated agent server, receiving recorded information from the communication session, and updating the function based on the recorded information.

13. The method of claim 1, further comprising:
providing the second entity with a piece of code to integrate second entity content into the first entity web site via the web communication service.

14. A method comprising:
hosting a first entity website with one or more website servers of a first entity;
establishing, via a web communication feature of the first entity website and a web communication portal, communication between a web communication service and a networked computer system of a second entity, wherein the web communication service portal enables a user of the second entity to interact with the web communication service;
managing, with the web communication service, web communication of the second entity website and a web communication agent service;
establishing a conversation, via the web communication service and the web communication agent service, between a user web application and an automated agent server of the second entity, the user web application interacting with content on a website:
forwarding a first message from the user web application to the automated agent server;
determining that the user web application should be connected to a live agent of the second entity;
transferring the conversation from the automated agent server to the live agent, including receiving setup information from a terminal of the live agent and forwarding the setup information to the user web application, wherein the setup information is forwarded to establish a communication between the terminal of the live agent and the user web application; and
forwarding contextual information to the terminal, the contextual information including a response to the first message.

15. The method of claim 14, wherein the content is provided by a first entity and the website is provided by a different entity.

16. The method of claim 14, further comprising:
sending information recorded from the communication session to the automated agent server; and
updating an automated agent function based on the information recorded from the communication session.

17. The method of claim 14, wherein the contextual information further includes a records of at least a portion of the conversation.

18. The method of claim 14, wherein the contextual information includes information derived by the automated agent server by processing information from the first message.

19. The method of claim 14, further comprising:
providing the second entity with a piece of code to integrate second entity content into the first entity web site via the web communication service.

20. A communication system comprising:
means for hosting a first entity website with one or more website servers of a first entity;
means for establishing, via a web communication feature of the first entity website and a web communication portal, communication between a web communication service and a networked computer system of a second entity, wherein the web communication service portal enables a user of the second entity to interact with the web communication service;
means for managing, with the web communication service, web communication of the second entity website and a web communication agent service;
means for establishing a conversation, via the web communication service and the web communication agent service, between a user web application and an automated agent of the second entity;
means for capturing contextual information associated with the conversation;
means for determining that a user of the user web application should be connected with a live agent of the second entity;
means for transferring the conversation from the automated to the live agent, including receiving setup information from a terminal of the live agent and forwarding the setup information to the user web application, where the setup information is forwarded to establish a communication session between the terminal of the live and the user application; and
means for providing the live agent with the contextual information.

21. The communication system of claim 20, comprising a Web Real Time Communication (WebRTC) service.

22. The communication system of claim 20, further comprising:
means for sending information recorded from the communication session to the automated agent; and
means for updating an automated agent function based on the information recorded from the communication session.

* * * * *